Nov. 25, 1952    D. SCOTT    2,619,026
COLLAPSIBLE STAND FOR BARBECUE
OR SHISHKABOB SPIT AND GRILLE
Filed May 23, 1951    2 SHEETS—SHEET 1
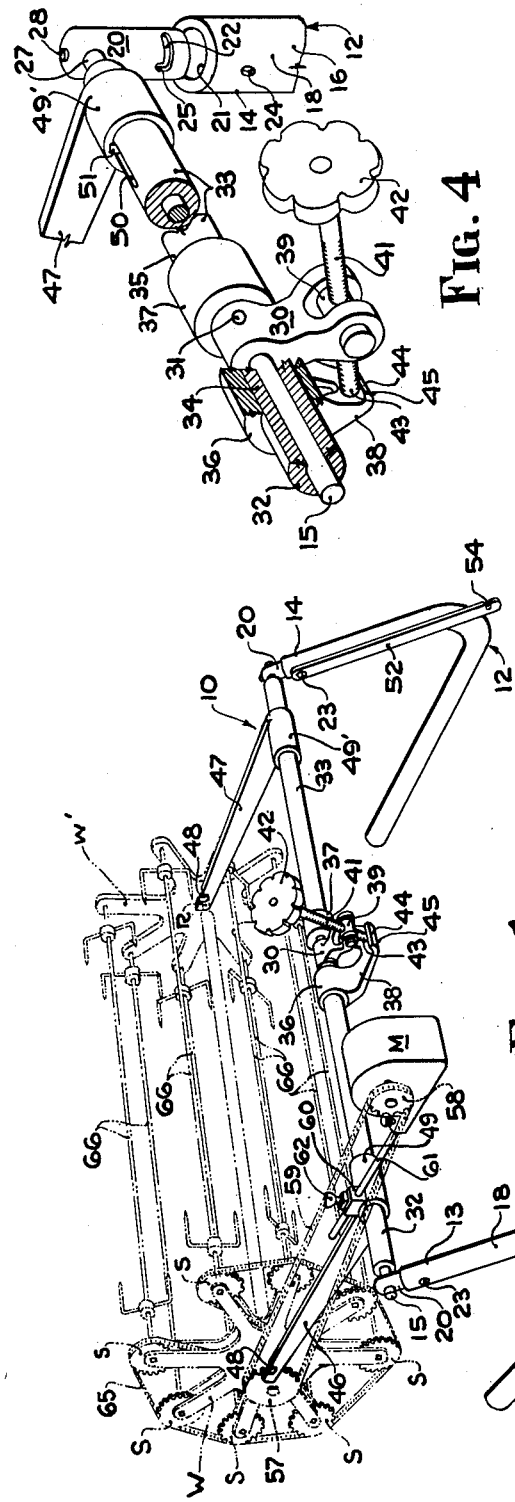
INVENTOR.
DONALD SCOTT
BY
Leslie M. Hansen
HIS ATTORNEY.

Nov. 25, 1952

D. SCOTT 2,619,026

COLLAPSIBLE STAND FOR BARBECUE
OR SHISHKABOB SPIT AND GRILLE

Filed May 23, 1951

INVENTOR.

Donald Scott

BY Leslie M. Hansen

HIS ATTORNEY.

Patented Nov. 25, 1952

2,619,026

UNITED STATES PATENT OFFICE 2,619,026

COLLAPSIBLE STAND FOR BARBECUE OR SHISHKABOB SPIT AND GRILLE

Donald Scott, San Jose, Calif.

Application May 23, 1951, Serial No. 227,816

7 Claims. (Cl. 99—393)

1

This invention relates to barbecue equipment and more particularly to a collapsible stand or rack for barbecue or shishkabob spits and grilles.

The invention contemplates the provision of a rack or stand for supporting a grille or rotary spit or spits and operating mechanism for the latter in a manner to facilitate changing the position of such grille or spit relative to a source of heat.

Another object of this invention is to provide a simple yet effective rack or stand which is foldable into a neat flat compact package when not in use.

Another object is to provide in a collapsible stand a novel cantilever structure for supporting a spit, grille or the like for ascension or descension relative to the surface on which said stand rests.

A further object of this invention is to provide in barbecue equipment a collapsible stand which is simple in construction, economical to manufacture and assemble and highly efficient in use.

These and other objects and advantages of the present invention will be made apparent in the following description in view of the drawings in which:

Fig. 1 is a front perspective view of the stand of the present invention shown in operating position.

Fig. 2 is a front view of the stand of Fig. 1 when it is in collapsed or inoperative position.

Fig. 3 is a side view of the stand as seen in Fig. 2.

Fig. 4 is an enlarged exploded perspective view of fragmentary portions of the stand seen in Fig. 1 with parts thereof shown in section for purposes of illustration.

Figure 5:
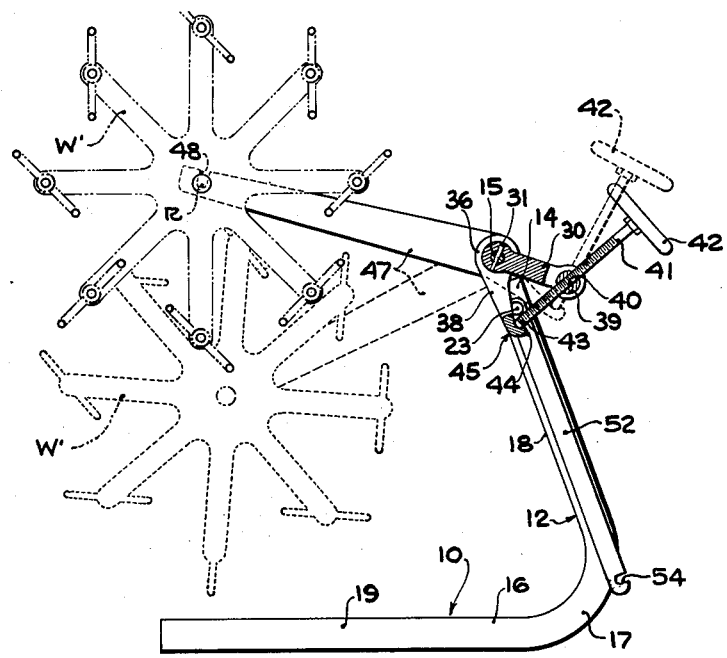
Fig. 5 is a side view of the stand when in use as shown in Fig. 1.

In the drawing the stand embodying the present invention is generally designated by reference numeral 10. This stand 10 comprises two legs 11 and 12 joined at their upper ends 13 and 14, respectively, to a cross bar 15.

Each leg 11 and 12 preferably consists of a tube 16 bent in a gradual curve 17 midway its ends to provide diverging foot and standard portions 18 and 19 disposed at an acute angle relative to each other.

The upper end 13—14 of each leg 11—12 includes a head 20, Fig. 4, inserted into the open end 21 of the standard 18. Each head 20 is identical to the other except that one is for the left leg 13 while the other is for the right leg 14 to thereby permit turning of each head in the proper direction relative to the respective leg. In this connection each head 20 has diametrically opposed circumferentially extending quadrantal slots 22 through which a pin 23 extends. The pin 23 is inserted through diametrically opposed holes 24 formed in the tubular standard 18. The slots 22 each terminate in a vertical recess 25 on the upper margin of the slot so that the head 20 will seat upon the pin 23 when the recess 25 registers with the latter. Each head 20 has a transverse bore 26 adjacent its upper end in parallelism with respect to the diametrically opposed recesses 25 so as to maintain the heads in proper alignment to receive the ends of the cross bar 15.

Each head 20 is secured by a pin 28 to the respective end 27 of the cross rod 15 to prevent rotation of the latter relative to the heads. However, in view of the bayonet and slot arrangement (pins 23 and slots 22) between the heads 20 and their respective legs 13 and 14, the legs can be turned relative to the heads 20. In this manner the foot portion 19 of each leg can be disposed in a plain common to that of the cross bar 15 when the stand 10 is collapsed, see Figs. 2 and 3. Moreover, the legs 13—14 can be turned into a position in which the foot portion 19 of each leg is disposed perpendicular relative to the axis of the cross bar. It is in this latter position that the recesses 25 register with the pins 23 to secure the legs in a position for supporting the cross bar above the surface upon which each foot 19 rests.

A clevis arm 30, Figs. 1 and 2, is secured by a pin 31 to the cross bar 15 midway its ends. A sleeve shaft is mounted on the cross bar 15, one sleeve shaft 32 to the left and another sleeve shaft 33 to the right side of the clevis arm 30. The ends 34 and 35 of these sleeve shafts 32 and 33 which are adjacent the clevis arm receive aligned bosses 36 and 37 of a yoke 38. These bosses 36—37 are secured to the sleeve shaft ends 34 and 35 respectively so that the sleve shafts will rock about the bar 15 in unison with each other and with the yoke 38.

The clevis arm 30 carries a swivel pin 39 adjacent its free end in parallel relation to the axis of the cross bar 15. This swivel pin has a tapped diametrical bore 40 between its ends for receiving the threaded shank 41 of a hand operated screw 42. The tip 43 of the screw shank 41 abuts against a hooked end 44 on the base 45 of the yoke 38 for limiting rocking movement of the sleeve shafts and yoke relative to the cross bar and clevis arm.

Each sleeve shaft 32 and 33 has an arm 46 and 47 respectively, secured to it for swinging movement therewith. These arms 46—47 extend from the rockable sleeve shafts parallel to each other and in cantilever fashion relative to the cross bar. Each arm 46—47 has a half circle recess 48 formed in its upper edge and adjacent its free end. These recesses are in axial alignment with each other to form seats for a spit, pintle or any other type of spindle.

The arms 46—47 are preferably slidable lengthwise the cross rod 27 to facilitate spreading them or moving them toward each other to suit spindles or grilles of different length. In this connection each arm 46—47 has a boss 49—49', respectively, slidably arranged on the particular sleeve shaft 32 or 33 to which it is attached. Each sleeve shaft has a keyway 50 formed therein parallel to its axis and the bosses 49—49' are secured by key lugs 51 to the sleeve shafts. In this manner the arms 46—47 are readily shiftable toward or from each other as necessary.

Figure 6:
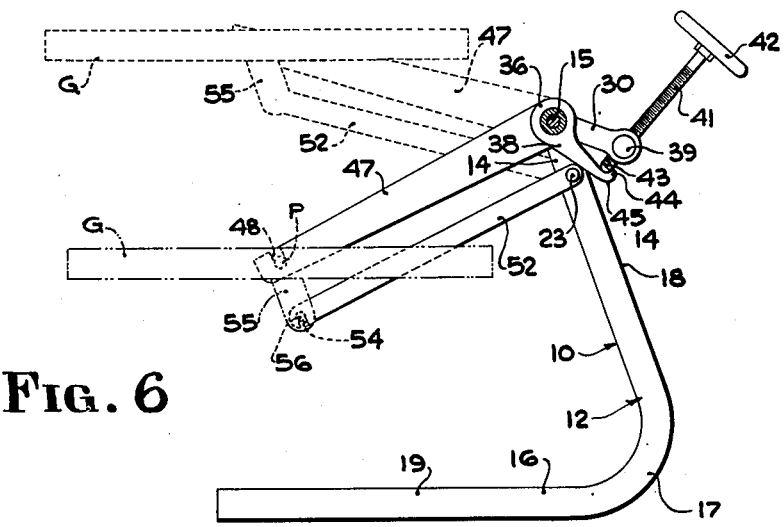
Fig. 6 is a side view similar to that of Fig. 5 illustrating use of the stand with a grille in lieu of a rotary spit.

As best illustrated in Figs. 1 and 5 the recesses 48 in arms 46—47 are adapted to receive a spit rod R or as shown in Fig. 6 a pintle P on the ends of a grille G may be seated in the respective recesses 48. In the case of the grille G, Fig. 6, one or both legs 13—14 has a link arm 52 pivotally connected by the pin 23 to its inner face, i. e., on an axis parallel to that of the bar 15 but spaced downwardly therefrom. This link arm 52 is identical in length to the arms 46—47 and is provided with a transverse slot 54 opening onto the bottom edge of the link arm but otherwise comparable to the recess 48 on the arms 46—47. The grill G has a depending leg 55 cooperable with the link arm 52 and this leg 55 extends at an angle relative to the grille comparable to the angle at which the standard 18 is disposed relative to the foot portion 19 of the leg 13 or 14. This depending leg 55 carries a capped stud 56 a radial distance from the pintle P comparable to the distance between the axes of cross bar 15 and pin 23. This stud 56 is adapted to be received by the slot 54 in the link arm 52 to effect a parallelogrammic bracket for the grille G to thereby support the grille parallel to the foot portions 19, i. e. horizontal, irrespective of the angular disposition of the arms 46—47 relative to the stand 10. In this manner when the hand screw 42 is manipulated the grille G will be lowered or raised in horizontal position toward and from the source of heat between the foot portions 19 of the legs.

When the stand 10 is to be used with a rotary spit rod R, as shown for example in Figs. 1 and 5, the link arms 52 are not required. In this case the spit rod R is merely raised or lowered relative to the source of heat by manipulation of the hand screw 42.

The rod R may be turned by hand or can be mechanically driven by means of an electric motor M in a conventional manner. In this connection the rod R has a sprocket 57 secured to it and drivingly connected to a sprocket 58 on the shaft of motor M by a chain 59.

While the motor M may well be supported separately from the stand 10 it is preferably secured to the stand in order to keep the chain 59 taut and the motor clear of any ash, flame or heat. For these reasons I provide a mounting lug 60 on the boss 49 of one of the arms 46—47 provided with a bore through which a cantilever rod 61 extends. This rod 61 is slidable for purposes of adjustment and is secured by a thumb nut 62 to the lug 60 to maintain the motor M on the opposite end of the rod 61 in a proper position radially of the cross bar 15 and relative to the sprocket 57 on the spit rod R. It will therefore be apparent that the motor M, rod 61 and arms 46—47 rock in unison with the sleeve shafts 32—33 relative to the cross bar 15 when the hand screw 42 is manipulated relative to the yoke 38.

In the planetary spit shown in Figs. 1 and 5 one wheel end W thereof is secured to the sprocket 57 for rotation therewith upon the rod R supported on the extended arms 46—47 of the stand. Each spoke of wheel W has a sprocket S journalled thereon to receive a chain 65 which is inversely trained around a stationary sprocket (not shown) affixed to the rod R which is keyed against rotation by the way it fits into the recess 48 on the arm 46. Consequently, as the wheel W turns about the rod R each sprocket S is turned relative to the spoke on which it is mounted. A separate spit 66 is drivingly connected to each sprocket S and has its opposite end supported for rotation in the opposite wheel W' of the planetary spit. In this manner each spit 66 turns about its axis while being moved around the axis of the rod R on the stand.

From the foregoing it will be apparent that I have provided a simple form of portable stand for barbecue mechanism. This stand and its associated parts are readily collapsed or assembled without too much difficulty and when collapsed can be laid flat for storage or carriage in a convenient manner. Moreover, the stand when assembled provides a simple manner of controlling the intensity of the heat relative to the food carried on the spit, spits or grille.

Having thus described my invention in specific detail it will be apparent that certain alterations, variations and modifications in structure may be made without departing from the spirit of my invention. I therefore desire to avail myself of all alterations, variations and modifications as fairly come within the purview of the appended claims.

What I claim as new and desire to protect by Letters Patent is:

1. A stand for a barbecue spit or grille comprising a pair of legs, a cross bar having its ends secured to the upper ends of said legs, a clevis arm secured to said cross bar midway its ends, a cantilever arm having a sleeve mounted on said cross bar on each side of said clevis arm, said cantilever arms each having a seat formed thereon adjacent its free end for supporting a spit or grille, a yoke secured to each of said sleeves for uniting said cantilever arms for extension from said cross bar in parallel relation and for unitary rocking movement relative to said cross bar, and a hand screw carried by said clevis arm and engaging said yoke for maintaining said cantilever arms in extended position laterally from said cross bar.

2. A stand for supporting a barbecue grille having axially aligned pintles extending from its ends comprising a pair of legs, a cross bar having its ends secured to the upper ends of said legs, a clevis arm secured to said cross bar midway its ends, a cantilever arm having a sleeve mounted on said cross bar on each side of said clevis arm, said cantilever arms each having a seat formed thereon adjacent its free end for receiving the axial aligned pintles on said grille, a yoke secured to each of said sleeves for uniting said cantilever arms for extension from said cross bar in parallel relation and for unitary rocking movement relative to said cross bar, a hand screw carried by said clevis arm and engaging said yoke for maintaining said cantilever arms in extended position laterally from said cross bar, said grille having a depending arm adjacent its mounting pintle, and link means between said depending arm and said legs cooperating with said cantilever arms to form a parallelogrammic bracket for holding said grille in a horizontal position irrespective of the disposition of said cantilever arms laterally of said cross bar.

3. A collapsible stand for a barbecue spit or grille comprising a pair of legs, a head rotatably mounted on the upper end of each of said legs, a cross bar having its ends secured to the head on the upper end of each of said legs, a clevis arm secured to said cross bar midway its ends, a cantilever arm having a sleeve mounted on said cross bar on each side of said clevis arm, said cantilever arms each having a seat formed thereon adjacent its free end for supporting said spit or grille, a yoke secured to each of said sleeves for uniting said cantilever arms for extension from said cross bar in parallel relation and for unitary rocking movement relative to said cross bar, and a hand screw carried by said clevis arm and engaging said yoke for maintaining said cantilever arms in extended position laterally from said cross bar.

4. A collapsible stand for a barbecue grille comprising a pair of legs, a head rotatably mounted on the upper end of each of said legs, a cross bar having its ends secured to the head on the upper end of each of said legs, a clevis arm secured to said cross bar midway its ends, a cantilever arm having a sleeve mounted on said cross bar on each side of said clevis arm, a grille having a pintle at each of its end edges, said cantilever arms each having a seat formed thereon adjacent its free end for pivotally supporting the respective pintle on the ends of said grille, a yoke secured to each of said sleeves for uniting said cantilever arms for extension from said cross bar in parallel relation and for unitary rocking movement relative to said cross bar, a hand screw carried by said clevis arm and engaging said yoke for maintaining said cantilever arms in extended position laterally from said cross bar, said grille having a depending arm adjacent at least one of its mounting pintles, and a link arm having its ends pivotally connected to said depending arm and one of said legs at substantially identical radial distances from said cross bar and said seat in the free end of said cantilever arms to form a parallelogrammic bracket for holding said grille horizontal irrespective of the angular disposition of said cantilever arms laterally of said cross bar.

5. A stand for a barbecue spit or grille comprising a pair of legs each having a foot portion and a standard disposed at an acute angle relative to each other, a head on each of said legs, a cross bar having its ends secured to said heads, means for securing said heads to the standard for limited rotation relative thereto including diametrically opposed circumferentially extending quadrantal slots in said head and a pin extending through said slots and said standard, said head having a recess formed vertically of diametrically opposed extremities of said slots for effecting seating of said pin into said recesses to support the foot portions of said legs in parallel relation transversely of said cross bar, a clevis arm secured to said cross bar midway its ends, a pair of cantilever arms each having a sleeve rotatably mounted on said cross bar on either side of said clevis arm, each cantilever arm having means on its terminal end for receiving said spit or grille, a yoke secured to the adjacent ends of each of said sleeves for uniting said cantilever arms for unitary rocking movement in parallelism relative to each other about said cross bar, and a hand operated screw carried by said clevis arm and engaging said yoke for maintaining the latter and said sleeves in a position to support said cantilever arms laterally from said cross bar.

6. A stand for a barbecue grille comprising a pair of legs each having a foot portion and a standard disposed at an acute angle relative to each other, a head on each of said legs, a cross bar secured at its ends to said heads, means for securing said heads to said standards for limited rotation relative thereto including diametrically opposed circumferentially extending quadrantal slots in said head and a pin extending through said slots and said standard, said head having a recess formed vertically of diametrically opposed extremities of said slots for effecting seating of said pin into said recesses to support said foot portions of said legs in parallel relation transversely of said cross bar, a clevis arm secured to said cross bar midway of its ends, a pair of cantilever arms each having a sleeve rotatably mounted on said cross bar on either side of said clevis arm, a grille having axially aligned spindles on its end edges, each cantilever arm having a seat formed on its terminal end for receiving the axial aligned spindles of said grille, a yoke secured to the adjacent ends of each of said sleeves for uniting said cantilever arm for unitary rocking movement in parallelism relative to each other about said cross bar, a hand operated screw carried by said clevis arm and engaging said yoke for maintaining the latter and said sleeves in a position to extend said cantilever arms laterally from said cross bar, and a linkage between at least one of said standards and a portion of said grille effecting a parallelogrammic bracket cooperative with said cantilever arms for supporting said grille parallel to said foot portions.

7. A stand for a barbecue spit having a drive pulley operatively connected thereto comprising a pair of legs each having a foot portion and a standard disposed at an acute angle relative to each other, a head on each of said legs, a cross bar having its ends secured to said heads, means for securing said heads to the standard for limited rotation relative thereto including diametrically opposed circumferentially extending quadrantal slots in said head and a pin extending through said slots and said standard whereby the foot portions of said legs can extend toward each other in substantially the same plane as said standards and said cross bar, said slots having a recess formed vertically of diametrically opposed extremities of said slots for effecting seating of said pin into said recesses to support said foot portions of said legs in parallel relation transversely of said cross bar, a clevis arm secured to said cross bar midway its ends, a pair of cantilever arms each having a sleeve rotatably mounted on said cross bar midway its ends, a pair of cantilever yoke secured to the adjacent ends of each of said sleeves for uniting said cantilever arms for unitary rocking movement in parallelism relative to each other about said cross bar, each said cantilever arm having axially aligned seat formations adjacent their free ends for receiving said spit, a motor carried by one of said cantilever arms for rocking movement therewith and including a pulley drivingly connected to the pulley on said spit, and a hand operated screw carried by said clevis arm and engaging said yoke for maintaining the latter and said sleeves in a position to extend said cantilever arms laterally from said cross bar.

DONALD SCOTT.

REFERENCES CITED

The following references are of record in the file of this patent:

UNITED STATES PATENTS

| Number | Name | Date |
|---|---|---|
| 2,131,251 | Ferri | Sept. 27, 1938 |
| 2,258,175 | Coleman | Oct. 7, 1941 |
| 2,478,061 | Stearns | Aug. 2, 1949 |
| 2,528,953 | Czupkaytii | Nov. 7, 1950 |